(12) United States Patent  
Buzzurro et al.

(10) Patent No.: US 10,655,811 B2  
(45) Date of Patent: May 19, 2020

(54) VEHICLE LIGHT WITH PORTIONS AT DIFFERENT LUMINANCE LEVELS

(71) Applicant: MARELLI AUTOMOTIVE LIGHTING ITALIA S.P.A., Turin (IT)

(72) Inventors: Alessandro Buzzurro, Turin (IT); Alessandro Sacca', Turin (IT)

(73) Assignee: MARELLI AUTOMOTIVE LIGHTING ITALY S.P.A., Turin (IT)

( * ) Notice: Subject to any disclaimer, the term of this patent is extended or adjusted under 35 U.S.C. 154(b) by 0 days.

(21) Appl. No.: 16/228,301

(22) Filed: Dec. 20, 2018

(65) Prior Publication Data

US 2019/0195450 A1 Jun. 27, 2019

(30) Foreign Application Priority Data

Dec. 21, 2017 (IT) .................. 102017000148141

(51) Int. Cl.  
*F21S 41/24* (2018.01)  
*F21V 8/00* (2006.01)  
(Continued)

(52) U.S. Cl.  
CPC ............. *F21S 41/24* (2018.01); *F21S 43/235* (2018.01); *F21S 43/239* (2018.01);  
(Continued)

(58) Field of Classification Search  
CPC ........ F21S 41/24; F21S 41/235; F21S 41/239; F21S 41/245; F21S 43/24; F21S 43/235; F21S 43/239; F21S 43/245  
See application file for complete search history.

(56) References Cited

U.S. PATENT DOCUMENTS 6,356,394 B1* 3/2002 Glienicke ............... B60Q 3/64  
                                                                                         359/641  
7,111,969 B2* 9/2006 Bottesch ............... B60Q 1/0052  
                                                                                         362/517  
(Continued)

FOREIGN PATENT DOCUMENTS

EP          3012522 A1     4/2016  
JP      2010205418 A     9/2010  
(Continued)

OTHER PUBLICATIONS

Search Report for Italian Application No. 201700148141 dated Aug. 14, 2018.

*Primary Examiner* — Julie A Bannan  
(74) *Attorney, Agent, or Firm* — Howard & Howard Attorneys PLLC

(57) ABSTRACT

A vehicle light comprising a container body and a lenticular body joined at least partially to close the container body, wherein the container body delimits a containment seat housing at least one light source that faces at least one light guide having a light guide body shaped to receive the light beam from a light input wall, and to transmit it to a light output wall and from this to a main light emission portion of the lenticular body. At least first extractor elements are placed between the light input wall and the light output wall, which extract a first extracted portion of the light beam emitted by the light source and direct it onto first reflecting elements separate from the light guide. The first reflecting elements reflect the first extracted portion towards the lenticular body at a first auxiliary light emission portion, separate from said main emission portion.

17 Claims, 5 Drawing Sheets

(51) Int. Cl.
  *F21S 43/235* (2018.01)
  *F21S 43/40* (2018.01)
  *F21S 43/245* (2018.01)
  *F21S 43/50* (2018.01)
  *F21S 43/239* (2018.01)
  *F21S 43/243* (2018.01)
  *F21W 102/00* (2018.01)
  *F21S 43/14* (2018.01)

(52) U.S. Cl.
  CPC ........... *F21S 43/243* (2018.01); *F21S 43/245* (2018.01); *F21S 43/40* (2018.01); *F21S 43/50* (2018.01); *G02B 6/0001* (2013.01); *F21S 43/14* (2018.01); *F21W 2102/00* (2018.01)

(56) References Cited

U.S. PATENT DOCUMENTS

| | | | | |
|---|---|---|---|---|
| 8,523,407 | B2* | 9/2013 | Huang | F21K 9/61 362/327 |
| 9,010,982 | B2* | 4/2015 | Kropac | G02B 6/0018 362/23.01 |
| 9,494,293 | B2* | 11/2016 | Pickard | F21V 15/013 |
| 2004/0141323 | A1* | 7/2004 | Aynie | F21V 7/0091 362/308 |
| 2004/0208019 | A1* | 10/2004 | Koizumi | B60Q 1/0041 362/545 |
| 2005/0281023 | A1* | 12/2005 | Gould | F21S 8/04 362/217.05 |
| 2008/0186726 | A1* | 8/2008 | Okada | B60Q 1/0041 362/509 |
| 2009/0052189 | A1* | 2/2009 | Kon | F21V 7/0091 362/296.01 |
| 2011/0128750 | A1* | 6/2011 | Nakada | B60Q 1/2696 362/518 |
| 2011/0242831 | A1* | 10/2011 | Okui | F21S 41/141 362/511 |
| 2012/0314448 | A1* | 12/2012 | Nakada | F21S 43/247 362/602 |
| 2013/0201709 | A1* | 8/2013 | Natsume | B60Q 1/00 362/511 |
| 2016/0040847 | A1* | 2/2016 | Ikuta | B60Q 1/2607 362/516 |
| 2016/0053962 | A1* | 2/2016 | Akutsu | B60Q 1/0052 362/511 |
| 2016/0091653 | A1* | 3/2016 | Ban | G02B 6/0043 362/613 |
| 2016/0138773 | A1* | 5/2016 | Kawabata | F21S 43/239 362/511 |
| 2016/0245974 | A1* | 8/2016 | Osaka | F21S 43/239 |
| 2017/0059113 | A1* | 3/2017 | Gloss | F21S 43/31 |
| 2018/0003878 | A1* | 1/2018 | Del Carmen Montano | G02B 6/0008 |

FOREIGN PATENT DOCUMENTS

JP       2014060085 A     4/2014
WO       2008035154 A1    3/2008

* cited by examiner

VEHICLE LIGHT WITH PORTIONS AT DIFFERENT LUMINANCE LEVELS

CROSS-REFERENCE TO RELATED APPLICATIONS

The present application claims priority to and all the benefits of Italian Patent Application No. 102017000148141, filed on Dec. 21, 2017, which is hereby expressly incorporated herein by reference in its entirety.

BACKGROUND OF THE INVENTION

1. Field of the Invention

The present invention concerns a vehicle light with portions at different luminance levels.

2. Description of the Related Art

The term "vehicle light" is intended indifferently to mean a rear vehicle light or a front vehicle light, the latter also being called a headlight or headlamp.

As is known, a vehicle light is a lighting and/or signaling device of a vehicle comprising at least one light external to the vehicle having a lighting and/or signaling function outwards from a vehicle such as, for example, a position light, a direction indicator light, a brake light, a rear fog light, a reversing light, a low beam headlight, a high beam headlight, and the like.

The vehicle light, in its simplest abstraction, comprises a container body, a lenticular body, and at least one light source.

The lenticular body is positioned to close the mouth of a container body so as to form a housing chamber. The light source is arranged inside the housing chamber, which may be turned so as to emit light toward the lenticular body when powered by electricity.

It is increasingly felt in the art the need to use the vehicle light not only as an instrument to satisfy the requirements of standardization in order to obtain light beams that meet particular photometric requirements, but also as an instrument of design specific to the vehicle on which the light is employed.

Therefore, the light pattern emitted by the light does not only have the function of fulfilling the signaling and/or lighting function but also that of creating a precise desired lighting effect.

An example of such a lighting effect comprises a light having portions defined by different luminance levels: typically, these are portions having the same signaling function, typically but not exclusively the stop, position, or direction indicator functions, or the like, wherein such portions pass from a lower luminance level to a higher luminance level. As a whole, the various portions, which are illuminated in unison, fulfill the technical function of emitting a certain general light signal having a predefined coloring and photometry within the established values.

Typically, but not necessarily, such portions at different luminance levels have the same shape/geometry: for example, these involve geometric lines that are parallel to each other, concentric circles and the like.

The number of adjacent portions at different light intensity emission levels is not necessarily equal to two, but may also be much higher, depending on the desired aesthetic effect.

The solutions of the prior art, even if effective from the photometric point of view, do not guarantee limited costs, weights and sizes nor simplicity in production.

In effect, it is known, for example, to obtain different levels of luminance using filters that partially absorb the light beam incident thereon.

This solution, although effective from an aesthetic point of view and still able to achieve the various desired emission levels, has the great drawback of being expensive and inefficient from an energy point of view. In effect, filters inevitably absorb part of the luminous power produced by the light source(s).

Therefore, the known system conceived in this way involves a considerable waste of light power, requiring the use of oversized light sources.

It is therefore felt in the art the need to provide a vehicle light that allows one to achieve different levels of luminance in an economical and at the same time energy-efficient way.

SUMMARY OF THE INVENTION

Such requirement is satisfied by a vehicle light including a container body and a lenticular body joined at least partially to close the container body. The container body delimits a containment seat housing at least one light source that emits a beam of light through the lenticular body. The light source faces at least one light guide having a light guide body shaped to receive the light beam from a light input wall, and to transmit it, by total internal reflection, to a light output wall and from this to a main light emission portion of the lenticular body. The light guide body includes at least first extractor elements, placed between the light input wall and the light output wall, which extract a first extracted portion of the light beam emitted by the light source and direct it onto first reflecting elements separate from the light guide. The first reflecting elements reflect the first extracted portion towards the lenticular body at a first auxiliary light emission portion of the lenticular body, separate from said main emission portion.

BRIEF DESCRIPTION OF THE DRAWINGS

Further features and advantages of the present invention will become more understandable from the following description of its preferred and non-limiting embodiments, wherein.

Figure 1:
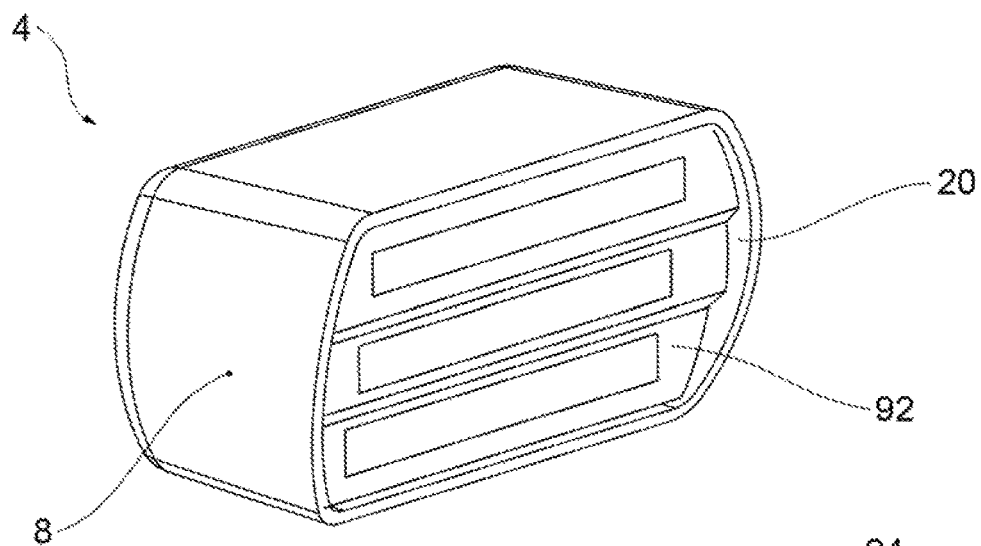
FIG. 1 shows a perspective view of a vehicle light according to one embodiment of the present invention.
Figure 2:
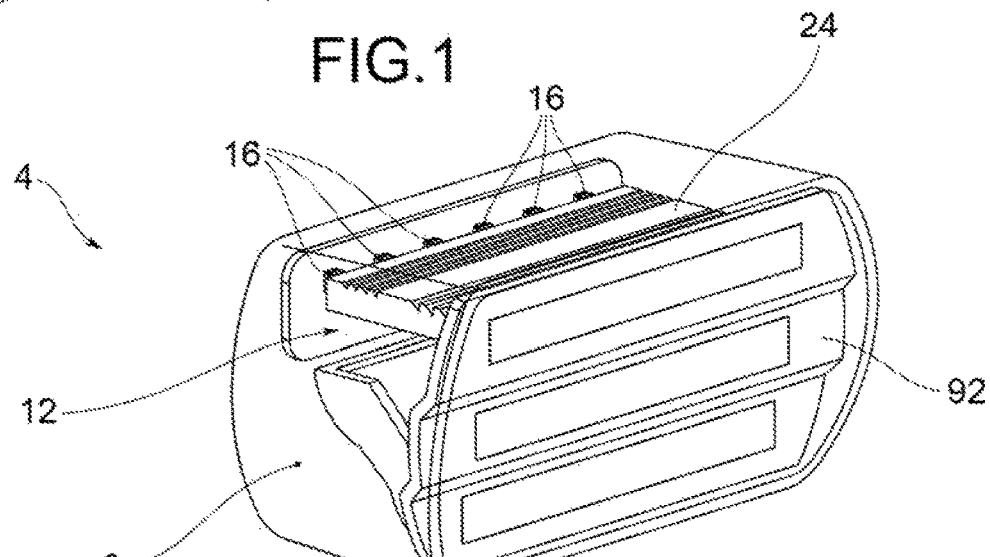
FIGS. 2-3 show perspective views, partially in cross-section, of the vehicle light of FIG. 1.
Figure 3:
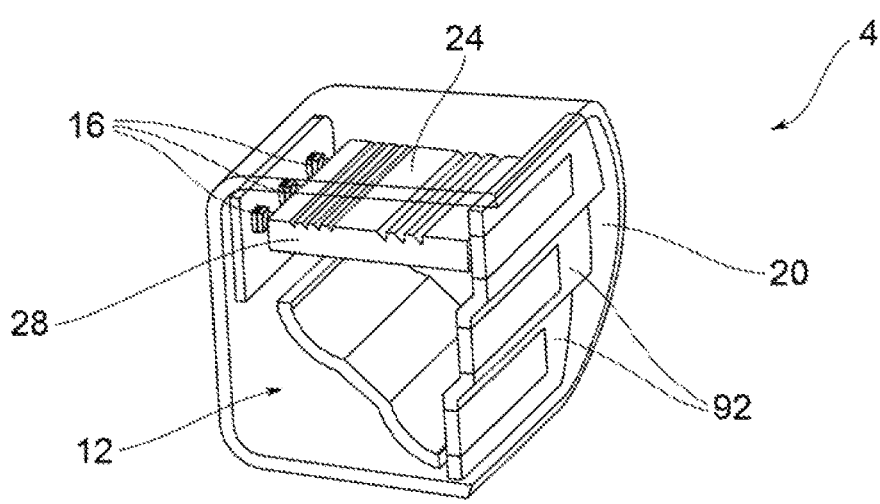
Figure 4:
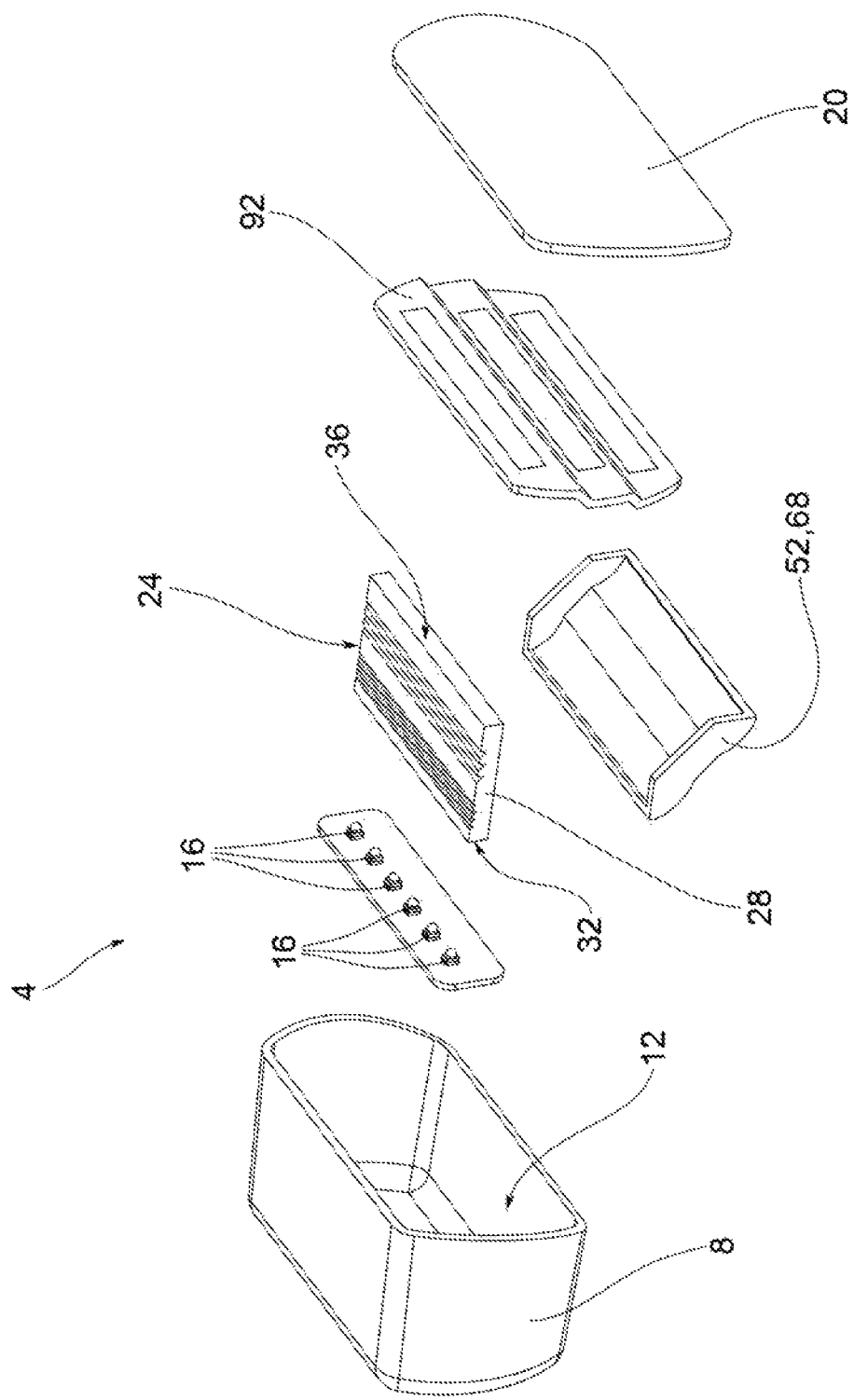
FIG. 4 shows a perspective view, in separate parts, of the vehicle light of FIG. 1.
Figure 5:
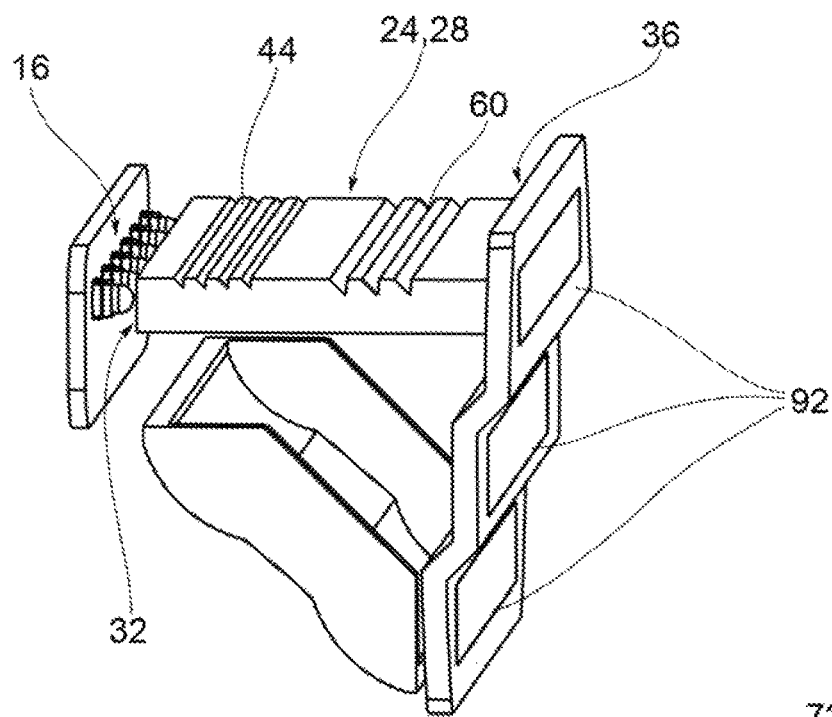
FIG. 5 shows a perspective view of some inner components of the vehicle light of FIG. 1.
Figure 6:
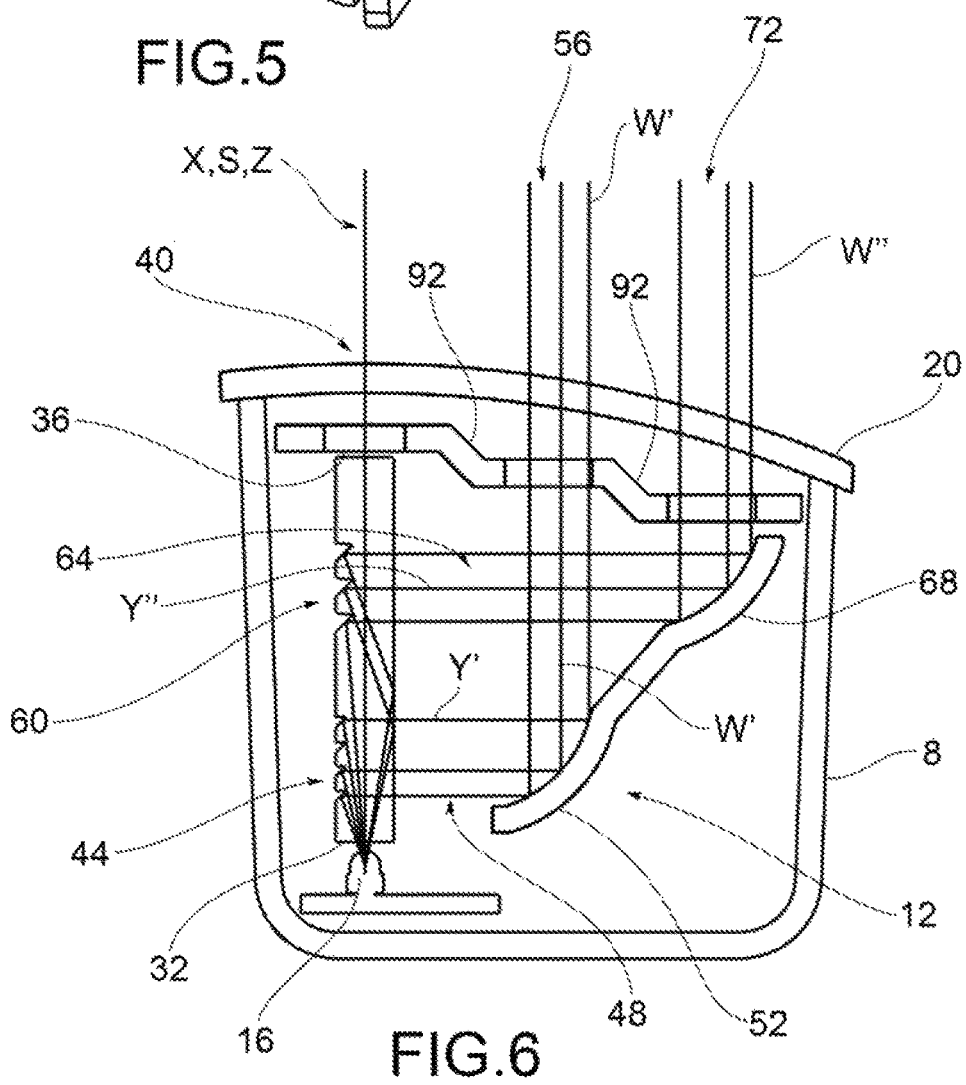
FIG. 6 shows a view in cross-section of the vehicle light of FIG. 1.
Figure 7:
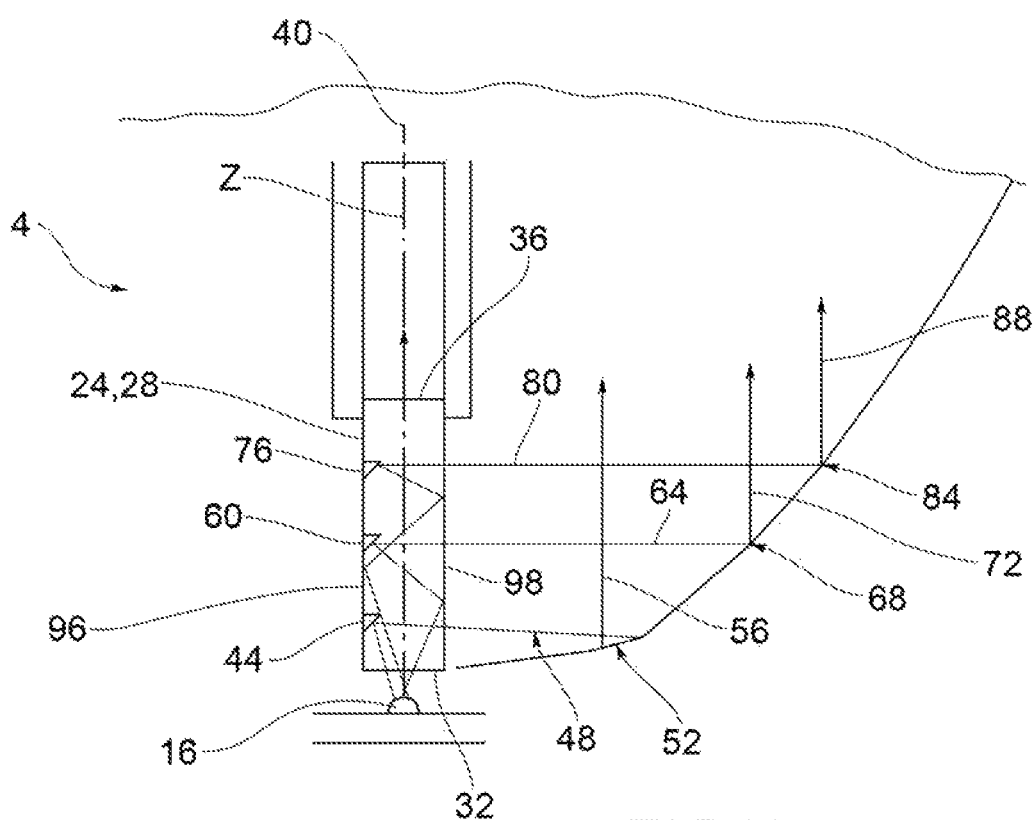
FIG. 7 shows a cross-sectional view of a further embodiment of the present invention.

The elements or parts of elements in common between the embodiments described hereinafter will be indicated at the same numerical references.

DETAILED DESCRIPTION OF THE INVENTION

With reference to the aforesaid figures, a vehicle light to which the following discussion will refer, without thereby losing generality, is indicated collectively at 4.

As mentioned above, the term "vehicle light" is intended indifferently to mean a rear vehicle light or a front vehicle light, the latter being also called a headlight or headlamp.

As is known, the vehicle light comprises at least one light outside of the vehicle having a lighting and/or signaling function, such as, for example, a position light, which may be a front, back or side position light, a direction indicator light, a brake light, a rear fog light, a reversing light, a low-beam headlight, a high-beam headlight, and the like.

The vehicle light 4 comprises a container body 8, usually made of polymeric material, which typically allows the vehicle light 4 to be attached to the relevant vehicle.

For the purposes of the present invention, the container body 8 may have any shape, size or position: for example, the container body may not be directly associated with the bodywork or other attachments of the vehicle on which it may be attached.

According to one embodiment, the container body 8 delimits a containment seat 12 that houses at least one light source 16 electrically connected to a source of power for powering the same and suitable to emit a light beam to be propagated toward the outside of the vehicle light. For the purposes of the present invention, the type of light source used is irrelevant; preferably, the light source is a light emitting diode (LED) light source.

The container body 8 is joined, at least partially in closing, to a lenticular body 20 so as to close said containment seat 12, which houses the at least one light source 16.

For the purposes of the present invention, the lenticular body 20 may be external to the vehicle light 4, so as to define at least one outer wall of the vehicle light directly subjected to the elements.

The lenticular body 20 closes the containment seat 12 and is suitable to be penetrated by the light beam produced by the light source, which is transmitted outside of the containment seat 12.

In this regard, the lenticular body 20 is made of at least partially transparent or semi-transparent or translucent material, which may also include one or more opaque portions, so as to allow the penetration, at least partial, of the light beam produced by the light source.

According to possible embodiments, the material of the lenticular body 20 is a resin such as PMMA, PC, and the like.

The at least one light source 16 faces at least one light guide 24 having a light guide body 28 shaped to receive the light beam from a light input wall 32, and to transmit it, by total internal reflection, to a light output wall 36 and from this to a main light emission portion 40 of the lenticular body 20.

The main light emission portion 40 represents a main light pattern emitted by the vehicle light through the lenticular body 20 thereof. Such main light emission portion 40 may have any geometric shape or size.

The light guide body 28 comprises at least the first extractor elements 44, positioned between the light input wall 32 and the light output wall 36, which extract a first extracted portion 48 of the light beam emitted by the light source 16 and direct it to a first reflecting element 52 separate from the light guide 24.

The first reflecting element 52 reflects the first extracted portion 48 towards the lenticular body 20 at a first auxiliary light output portion 56 of the lenticular body 20, separate from the main light emission portion 40.

Such first auxiliary light emission portion 56 may have any geometric shape and size.

The first auxiliary light emission portion 56 may have the same pattern, i.e. the same geometric shape and size as the main light emission portion 40 or may also have a different pattern.

In one embodiment, the first extractor elements 44 extract the first extracted portion 48 according to a first extraction direction Y'-Y' substantially perpendicular to a main propagation direction X-X of the light beam inside the light guide body 28.

The first extractor elements 44 may comprise prisms.

The first extractor elements 44 and the first reflecting elements 52 direct the light beams of the first extracted portion 48 along a first auxiliary direction W' substantially parallel to an output direction Z from the light output wall 36 of the main light emission portion 40.

According to one embodiment, the light guide body 28 comprises second extractor elements 60, positioned between the light input wall 32 and the light output wall 36, which extract a second extracted portion 64 of the light beam emitted by the light source 16 and direct it onto second reflecting elements 68.

The second reflecting elements 68 reflect the second extracted portion 64 towards the lenticular body 20 at a second auxiliary light emission portion 72 of the lenticular body 20, distinct from said first auxiliary light emission portion 56 and from said main light emission portion 40.

In one embodiment, the second extractor elements 60 extract the second extracted portion 64 along a second extraction direction Y"-Y" substantially perpendicular to a main propagation direction X-X of the light beam inside the light guide body 28.

The second extractor elements 60 may comprise prisms.

The second extractor elements 60 and/or the second reflecting elements 68 direct the light beams of the second extracted portion 64 along a second auxiliary direction W" substantially parallel relative to an output direction Z from the light output wall 36 of the main light emission portion 40.

According to one embodiment, the light guide body 28 comprises third extractor elements 76, positioned between the light input wall 32 and the light output wall 36, which extract a third extracted portion 80 of the light beam emitted by the light source 16 and direct it to third reflecting elements 84.

The third reflecting elements 84 reflect the third extracted portion 80 towards the lenticular body 20 at a third auxiliary light emission portion 88 of the lenticular body 20, distinct from said first and second auxiliary light emission portion 56, 72 and from said main light emission portion 40.

In one embodiment, the third extractor elements 76 extract the third extracted portion 80 along a third extraction direction Y'''-Y''' substantially perpendicular to a main propagation direction X-X of the light beam inside the light guide body 28.

In one embodiment, the third extractor elements 76 and/or the third reflecting elements 84 direct the light beams of the third extracted portion 80 along a third auxiliary direction W''' substantially parallel to an output direction Z from the light output wall 36 of the main light emission portion 40.

According to a possible embodiment, the main light emission portion 40 and the auxiliary light emission portions 56, 72, 88 are delimited by at least one mask 92 so as to clearly delimit the outline of the main light emission portion 40 and each auxiliary light emission portion 56, 72, 88.

According to one embodiment, the main light emission portion 40 and the auxiliary light emission portions 56, 72, 88 have different luminance levels.

In particular, the luminance level of the main light emission portion 40 is given by the difference between the total luminance emitted by the light source 16 and the powers of the auxiliary light emission portions 56, 72, 88 (less any losses such as due to internal absorption or leakage). It is therefore clear that it is possible to calibrate the quantities of the light beams extracted in order to obtain a specific distribution of the luminous powers both of the main light emission portion 4 and of the various auxiliary light emission portions 56, 72, 88.

Figure 10:
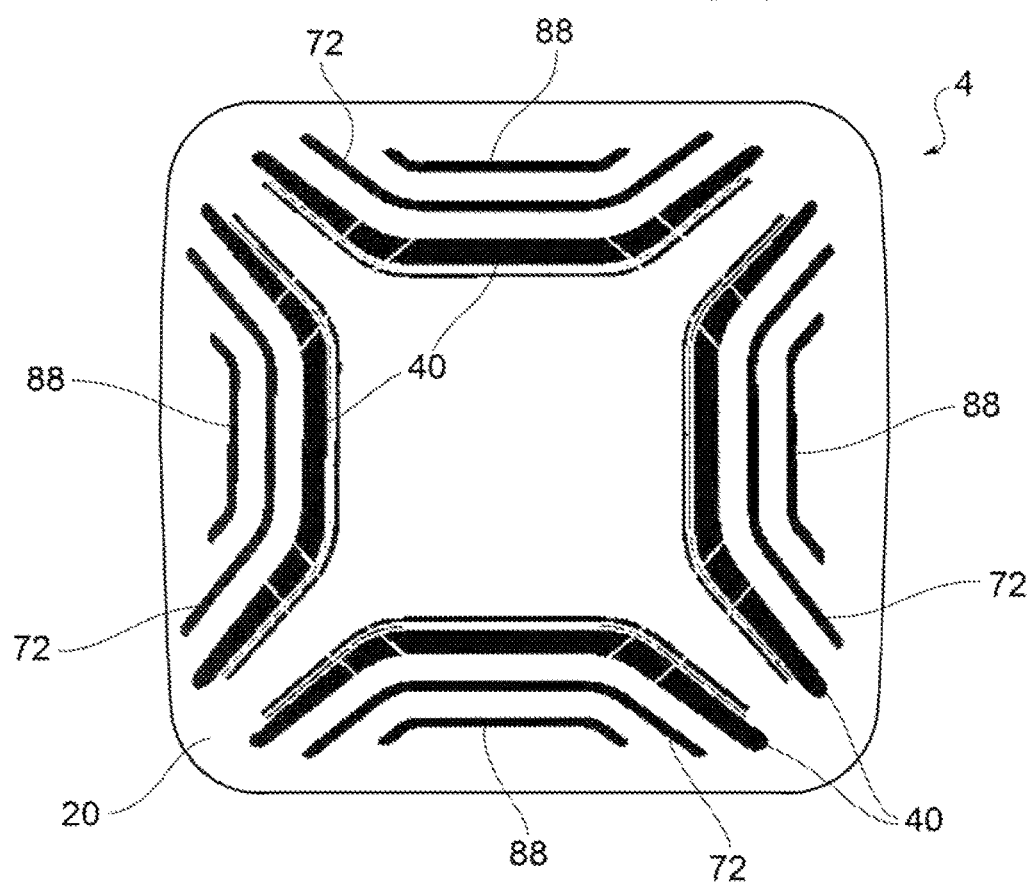
FIG. 10 shows a front view of a vehicle light according to one embodiment of the present invention.

For example, three distinct patterns having different levels of light intensity may be created, such as high intensity, medium intensity and low intensity, alongside each other. The patterns, as seen, may also present the same trend, i.e. the same profile, so as to result one offset from the other, so as to highlight more the different levels of light intensity (FIG. 10).

For this purpose, the number and/or geometry of the first, second and third extractor elements 44, 60, 76 (prisms) respectively may vary in order to define the distribution of luminance levels.

The configurations described above may be applied to various light guide body types 28.

For example, it is possible to provide for a light guide body 28 that has a main direction of extension S-S, and wherein the extractor elements 44, 60, 76 extract the light along the extraction directions Y', Y'', Y''' substantially perpendicular to the main direction of extension S-S (FIGS. 1-7, 9).

Figure 9:
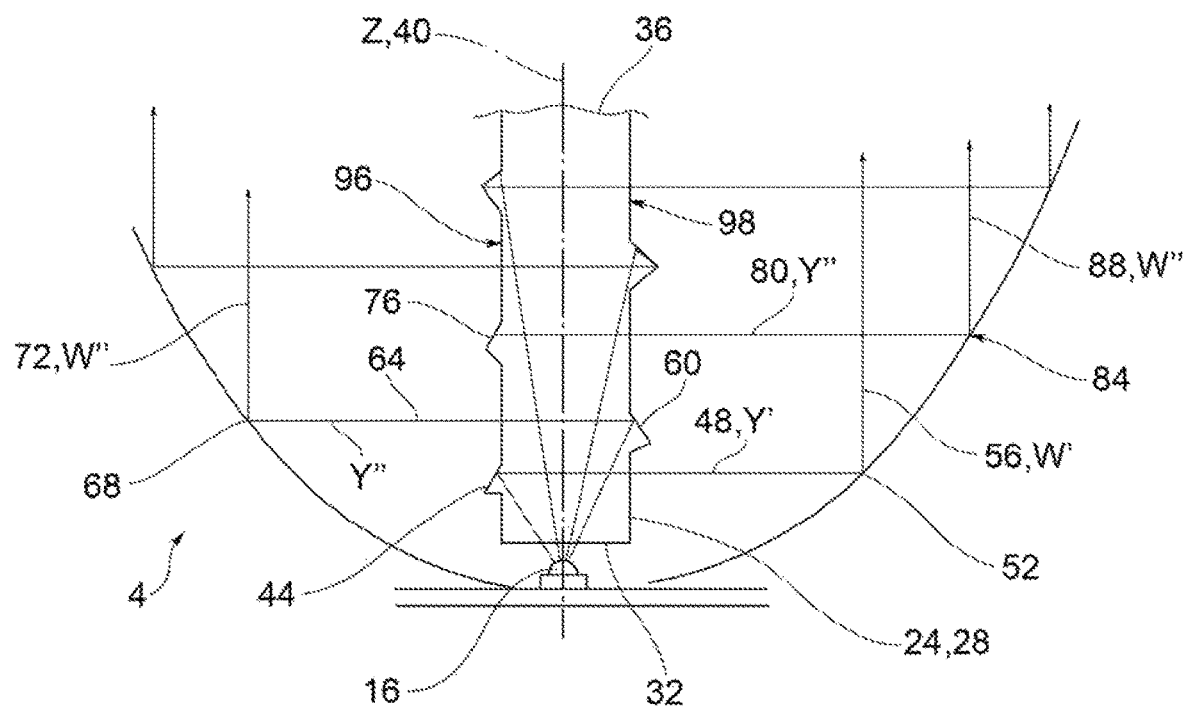
FIG. 9 shows a cross-sectional view of a further embodiment of the present invention.

For example, the light guide body 28 has a pair of side walls 96, 98 opposite each other, substantially parallel to the main direction of extension S-S, and the extractor elements 44, 60, 76 are arranged on both said side walls 96, 98, so as to extract light beams in opposite directions onto reflecting elements 52, 68, 84 arranged on opposite sides relative to the light guide body 28 (FIG. 9).

Figure 8:
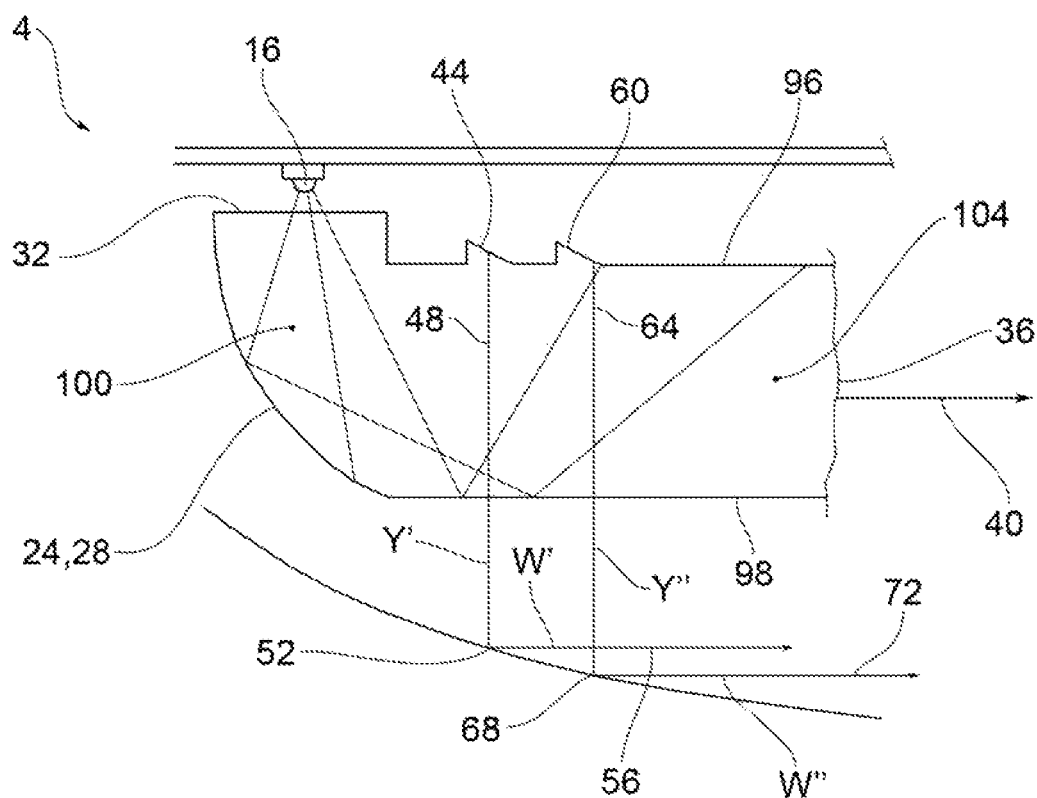
FIG. 8 shows a cross-sectional view of a further embodiment of the present invention.

According to a further embodiment (FIG. 8), the light guide body 28 has an 'L' shape with two branches substantially perpendicular to each other, wherein the first branch 100 comprises the light input wall 32 and the second branch 104 comprises the light output wall 36.

For example, the extractor elements 44, 60, 76 are arranged on the second branch 104.

The extractor elements 44, 60, 76 are typically prisms.

The reflecting elements 52, 68, 84 may comprise a plurality of mirrors and may also comprise light beam collimating elements.

As may be appreciated from the foregoing, the present invention allows the disadvantages of the prior art to be overcome.

In particular, the light according to the present invention allows any predefined light pattern equipped with portions at different luminance levels to be obtained and all the photometric specifications for the light to be met.

There are no limitations in terms of geometry or patterns of the portions at different obtainable levels of luminance.

The light patterns are also characterized by a remarkable uniformity and homogeneity of the light beam diffused outside the vehicle light.

Therefore, by virtue of the present invention, it is possible to obtain any kind of light pattern, i.e., of any geometric shape, while maintaining a high energy efficiency and homogeneity of illumination of the same pattern.

The solution is simple to implement, with limited costs, weights and overall dimensions.

The present solution is also energy-efficient, since it does not involve the dissipation of light energy found in the solutions of the prior art, which, in order to obtain the same technical and visual effect, use filters that absorb at least partially the luminance emitted by the light sources. In this way, there is no need to oversize the light sources to take into account the luminance lost in the filters, as is the case with known solutions.

One skilled in the art, in the object of satisfying contingent and specific requirements, may make numerous modifications and variations to the vehicle light described above, all of which are within the scope of the invention as defined by the following claims.

The invention claimed is:

1. A vehicle light comprising:
    a container body and a lenticular body joined at least partially to close the container body,
    wherein the container body delimits a containment seat housing at least one light source that emits a beam of light through the lenticular body,
    wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body,
    wherein the light guide body comprises at least first extractor elements, placed between the light input wall and the light output wall, which extract a first extracted portion of the light beam emitted by the light source and direct it onto a first reflecting element separate from the light guide, said first reflecting element reflecting said first extracted portion towards the lenticular body at a first auxiliary light emission portion of the lenticular body, separate from said main emission portion, and
    wherein the main light emission portion and the auxiliary light emission portions are delimited by at least one mask so as to clearly delimit the outline of the main light emission portion and the auxiliary light emission portion.

2. The vehicle light as set forth in claim 1, wherein the first extractor elements extract the first extracted portion according to a first extraction direction substantially perpendicular to a main propagation direction of the light beam inside the light guide body.

3. The vehicle light as set forth in claim 1, wherein the first extractor elements and the first reflecting element direct the light beams of the first extracted portion along a first auxiliary direction substantially parallel to an output direction from the light output wall of the main light emission portion.

4. The vehicle light as set forth in claim 1, wherein the light guide body comprises second extractor elements, placed between the light input wall and the light output wall, which extract a second extracted portion of the light beam emitted by the light source and direct it onto a second reflecting element, said second reflecting element reflecting said second extracted portion towards the lenticular body at a second auxiliary light emission portion of the lenticular body, separate from said first auxiliary light emission portion and from said main light emission portion.

5. The vehicle light as set forth in claim 4, wherein the second extractor elements extract the second extracted portion along a second extraction direction substantially perpendicular to a main propagation direction of the light beam inside the light guide body.

6. The vehicle light as set forth in claim 4, wherein the second extractor elements and/or the second reflecting element direct the light beams of the second extracted portion along a second auxiliary direction substantially parallel to an output direction from the light output wall of the main light emission portion.

7. The vehicle light as set forth in claim 1, wherein the light guide body comprises third extractor elements, placed between the light input wall and the light output wall, which extract a third extracted portion of the light beam emitted by the light source and direct it onto a third reflecting element, wherein the third reflecting element reflects the third extracted portion towards the lenticular body at a third auxiliary light emission portion of the lenticular body, separate from said first and second auxiliary light emission portions and from said main light emission portion.

8. The vehicle light as set forth in claim 7, wherein the third extractor elements extract the third extracted portion according to a third extraction direction substantially perpendicular to a main propagation direction of the light beam inside the light guide body.

9. The vehicle light as set forth in claim 7, wherein the third extractor elements and/or the third reflecting element direct the light beams of the third extracted portion along a third auxiliary direction substantially parallel to an output direction from the light output wall of the main light emission portion.

10. The vehicle light as set forth in claim 1 wherein the extractor elements are configured so that the main light emission portion and the auxiliary light emission portions have different luminance levels.

11. The vehicle light as set forth in claim 1, wherein the extractor elements are arranged on the second branch.

12. The vehicle light as set forth in claim 1, wherein said light source is a LED source.

13. A vehicle light comprising:
a container body and a lenticular body joined at least partially to close the container body,
wherein the container body delimits a containment seat housing at least one light source that emits a beam of light through the lenticular body,
wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body,
wherein the light guide body comprises at least first extractor elements, placed between the light input wall and the light output wall, which extract a first extracted portion of the light beam emitted by the light source and direct it onto a first reflecting element separate from the light guide, said first reflecting element reflecting said first extracted portion towards the lenticular body at a first auxiliary light emission portion of the lenticular body, separate from said main emission portion, and
wherein the light guide body has a main direction of extension, and a pair of side walls opposite each other, substantially parallel to the main direction of extension, and the extractor elements are arranged on both said side walls, so as to extract the light along extraction directions substantially perpendicular to the main direction of extension, and the light beams in opposite directions onto reflecting elements arranged on opposite sides relative to the light guide body.

14. A vehicle light comprising:
a container body and a lenticular body joined at least partially to close the container body,
wherein the container body delimits a containment seat housing at least one light source that emits a beam of light through the lenticular body,
wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body,
wherein the light guide body comprises at least first extractor elements, placed between the light input wall and the light output wall, which extract a first extracted portion of the light beam emitted by the light source and direct it onto a first reflecting element separate from the light guide, said first reflecting element reflecting said first extracted portion towards the lenticular body at a first auxiliary light emission portion of the lenticular body, separate from said main emission portion, and
wherein the light guide body has an 'L' shape with two branches substantially perpendicular to each other, wherein the first branch comprises the light input wall and the second branch comprises the light output wall.

15. A vehicle light comprising:
a container body and a lenticular body joined at least partially to close the container body,
wherein the container body delimits a containment seat housing at least one light source that emits a beam of light through the lenticular body,
wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body,
wherein the light guide body comprises at least first extractor elements that include prisms placed between the light input wall and the light output wall, which extract a first extracted portion of the light beam emitted by the light source and direct it onto a first reflecting element separate from the light guide, said first reflecting element reflecting said first extracted portion towards the lenticular body at a first auxiliary light emission portion of the lenticular body, separate from said main emission portion.

16. A vehicle light comprising:
a container body and a lenticular body joined at least partially to close the container body,
wherein the container body delimits a containment seat housing at least one light source that emits a beam of light through the lenticular body,
wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body, wherein the light guide body comprises at least first extractor elements, placed between the light input wall and the light output wall, which extract a first extracted portion of the light beam emitted by the light source and direct it onto a first reflecting element separate from the light guide, said first reflecting element including a plurality of mirrors reflecting said first extracted portion towards the lenticular body at a first auxiliary light emission portion of the lenticular body, separate from said main emission portion.

17. A vehicle light comprising:

a container body and a lenticular body joined at least partially to close the container body, wherein the container body delimits a containment seat housing at least one light source that emits a beam of light through the lenticular body, wherein said at least one light source faces at least one light guide having a light guide body shaped to receive the light beam from a light input wall, and to transmit it, by total internal reflection, to a light output wall and wherein the light emitted from the output wall is transmitted to a main light emission portion of the lenticular body, wherein the light guide body comprises at least first extractor elements, placed between the light input wall and the light output wall, which extract a first extracted portion of the light beam emitted by the light source and direct it onto a first reflecting element separate from the light guide, said first reflecting element including a light beam collimator element reflecting said first extracted portion towards the lenticular body at a first auxiliary light emission portion of the lenticular body, separate from said main emission portion.

* * * * *

UNITED STATES PATENT AND TRADEMARK OFFICE
CERTIFICATE OF CORRECTION

PATENT NO. : 10,655,811 B2
APPLICATION NO. : 16/228301
DATED : May 19, 2020
INVENTOR(S) : Alessandro Buzzurro et al.

It is certified that error appears in the above-identified patent and that said Letters Patent is hereby corrected as shown below:

On the Title Page

Item (71) Applicant: delete "MARELLI AUTOMOTIVE LIGHTING ITALIA S.P.A." and insert therefor --MARELLI AUTOMOTIVE LIGHTING ITALY S.P.A.--.

Signed and Sealed this
Third Day of November, 2020

Andrei Iancu
*Director of the United States Patent and Trademark Office*